United States Patent [19]
Lee

[11] 3,856,958
[45] Dec. 24, 1974

[54] 1-(5-PHENYL-4-OXO-2-OXAZOLIN-2-YL)-4-CINNAMOYLPIPERAZINES IN THE TREATMENT OF DEPRESSION

[75] Inventor: Cheuk Man Lee, Waukegan, Ill.

[73] Assignee: Abbott Laboratories, North Chicago, Ill.

[22] Filed: Dec. 17, 1973

[21] Appl. No.: 425,394

Related U.S. Application Data

[60] Continuation-in-part of Ser. No. 368,377, June 8, 1973, abandoned, which is a division of Ser. No. 258,144, May 31, 1972, Pat. No. 3,784,545.

[52] U.S. Cl............................................. 424/250
[51] Int. Cl............................................ A61k 27/00
[58] Field of Search.................................. 424/250

Primary Examiner—Stanley J. Friedman
Attorney, Agent, or Firm—Robert L. Niblack; James L. Bailey; Vincent A. Mallare

[57] ABSTRACT 1-(5-Phenyl-4-oxo-2-oxazolin-2-yl)-4-cinnamoylpiperazines represented by the formula

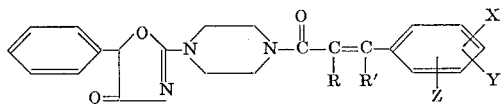

wherein R is hydrogen or loweralkyl; R' is hydrogen or loweralkyl; and X, Y and Z each are hydrogen, halogen or loweralkyl. The compounds exhibit antidepressant activity.

3 Claims, No Drawings

1-(5-PHENYL-4-OXO-2-OXAZOLIN-2-YL)-4-CINNAMOYLPIPERAZINES IN THE TREATMENT OF DEPRESSION

CROSS-REFERENCE TO RELATED APPLICATIONS

This application is a continuation-in-part of copending application, Ser. No. 368,377, filed June 8, 1973, now abandoned which is a divisional of copending application, Ser. No. 258,144, filed May 31, 1972 now U.S. 3,784,545.

BACKGROUND OF THE INVENTION

Patients suffering from depression manifest one or more of a variety of symptoms. Generally speaking, a depressed patient feels incapable of dealing with his responsibilities. The predominate symptoms of depression are hypochondria, anoxeria, insomnia, anergia, anhedonia and pessimism. Patients suffering from these symptoms are usually treated with anti-depressants. The present invention provides a method for treating patients exhibiting these symptoms of depression.

DETAILED DESCRIPTION OF THE INVENTION

This invention relates to 1-(5-phenyl-4-oxo-2-oxazolin-2-yl)-4-cinnamoylpiperazines which are useful as anti-depressant agents.

The compounds of this invention are represented by the formula

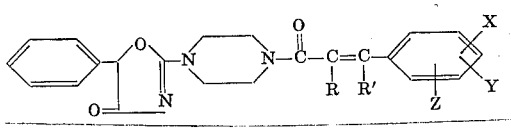

wherein R is hydrogen or loweralkyl; R' is hydrogen or loweralkyl; and X, Y and Z each are hydrogen, halogen or loweralkoxy.

The term "loweralkyl" as used herein refers to $C_1$-$C_6$ straight and branched chain alkyl radicals including methyl, ethyl, n-propyl, iso-propyl, n-butyl, sec-butyl, n-pentyl, iso-pentyl, neo-pentyl, n-hexyl and the like.

The term "loweralkoxy" refers to methoxy, ethoxy, propoxy and butoxy.

The term "halogen" as used herein refers to chlorine, fluorine, bromine and iodine.

The compounds of this invention exhibit central nervous system activity and are particularly useful as anti-depressants at dosages of 25 to 50 mg./kg. of body weight daily. The anti-depressant activity of the compounds herein was established in the modified dopa test as described by Everett, "The Dopa Response Potentiation Test and Its Use For Screening for Anti-Depressant Drugs," *Excerpt. Medica. International Congress Series* 122, Pages 164–167 (1966).

Generally speaking, compounds of this invention are prepared by reacting 1-(5-phenyl-4-oxo-2-oxazolin-2-yl)piperazine with an appropriately substituted cinnamoyl halide in the presence of an acid acceptor in an inert solvent. The starting piperazines can be prepared according to the method described in U.S. Pat. No. 3,567,826. The cinnamoyl halides can be made by standard procedures.

The following examples further illustrate this invention:

EXAMPLE 1

1-(5-Phenyl-4-Oxo-2-Oxazolin-2-Yl)-4-(3,4,5-Trimethoxycinnamoyl)-Piperazine

A mixture of 5.0 g. of 3,4,5-trimethoxycinnamic acid, 2 ml. of phosphorus trichloride and 25 ml. of benzene was stirred and refluxed for 1 hour. The hot mixture was filtered and the filtrate was evaporated in vacuo. The residue was dissolved in 15 ml. of N,N-dimethylacetamide and added dropwise to a stirred solution of 3.9 g. of 1-(5-phenyl-4-oxo-2-oxazolin-2-yl)piperazine and 1.6 g. of triethylamine in 60 ml. of N,N-dimethylacetamide. The mixture was stirred at room temperature for 2 hours and was filtered. The filtrate was diluted with water and the product was collected and recrystallized from 3A-ethanol, m.p. 222°–223°.

| Analysis Calcd. for $C_{25}H_{27}N_3O_6$: | C, 64.50; H, 5.85; N, 9.03 |
|---|---|
| Found: | C, 64.77; H, 5.75; N, 8.95 |

EXAMPLES 2–4

The following compounds were prepared according to the method of Example 1 substituting the appropriately substituted cinnamic acid for 3,4,5-trimethoxycinnamic acid.

1-(3-Bromo-4,5-dimethoxycinnamoyl)-4-(5-phenyl-4-oxo-2-oxazolin-2-yl)piperazine, m.p. 227°–229°.

| Analysis Calcd. for $C_{24}H_{24}BrN_3O_5$: | C, 56.15; H, 4.72; N, 8.19 |
|---|---|
| Found: | C, 56.30; H, 4.84; N, 8.11 |

1-(p-Methoxycinnamoyl)-4-(5-phenyl-4-oxo-2-oxazolin-2-yl)piperazine, m.p. 211°–212°.

| Analysis Calcd. for $C_{23}H_{23}N_3O_4$: | C, 68.13; H, 5.72; N, 10.37 |
|---|---|
| Found: | C, 67.87; H, 5.92; N, 10.53 |

1-(5-Phenyl-4-oxo-2-oxazolin-2-yl)-4-(3,4,5-trimethoxy-β-methylcinnamoyl)piperazine, m.p. 164°–165°.

| Analysis Calcd. for $C_{26}H_{29}N_3O_6$: | C, 65.12; H, 6.09; N, 8.76 |
|---|---|
| Found: | C, 64.99; H, 6.38; N, 8.92 |

EXAMPLE 5

1-(p-Fluorocinnamoyl)-4-(5-Phenyl-4-Oxo-2-Oxazolin-2-Yl)-Piperazine

A mixture of 8.3 g. (0.05 mole) of p-fluorocinnamic acid, 13 ml. of thionyl chloride and 30 ml. of benzene was stirred and refluxed for 2 hours. The solvent and excess thionyl chloride was removed by evaporation in vacuo. The residue was treated in benzene and again evaporated in vacuo. The residue was dissolved in 25 ml. of N,N-dimethylacetamide and added dropwise to a stirred solution of 12.26 g. (0.05 mole) of 1-(5-phenyl-4-oxo-2-oxazolin-2-yl)piperazine, 5.06 g. (0.05 mole) of triethylamine and 120 ml. of N,N-dimethylacetamide. The mixture was stirred at room temperature for 2 hours and was filtered. The filtrate was diluted with water and the product was collected and recrystallized from 3A-ethanol; m.p. 241°–243°.

Analysis Calcd.
for $C_{22}H_{20}FN_3O_3$: C, 67.16; H, 5.13; N, 10.68
Found: C, 66.88; H, 5.02; N, 10.67

The piperazines can be administered orally or by injection. For the latter, solutions or suspensions may be prepared by slurrying 1–10 percent of piperazine in water containing 0.1–2 percent of carboxymethylcellulose. Suspensions may also be prepared by using 0.05–0 percent tragacanth solutions. For oral administration, tablets, pills or capsules are easily prepared. Tablets may be prepared to contain between 5 and 25 mg. of the active ingredient together with the usual tableting adjuvants, e.g., coloring agents, flavoring agents, diluents, lubricants, carriers, and, if desired, dispersing agents or relief retardants. The piperazine may also be combined with other active compounds such as tranquilizers.

The piperazine anti-depressant when administered to mammals such as humans is effective in a dosage range from about 0.1 to about 100 mg./kg. of body weight daily, either in single or divided dosages. More often, the daily dosage range is 25–50 mg./kg.

The following further illustrates pharmaceutical compositions in oral dosage form.

In order to prepare capsules, the following procedure was employed: Specifically, here, sufficient pharmaceutical composition was formulated to prepare 1,000 capsules. 25.00 gm. of piperazine was preblended with 212.5 gm. of lactose, U.S.P. and 12.5 gm. of talc, U.S.P. The preblend was then passed through a suitable screen and the screened powders were then blended. The powders were then filled into gelatin size No. 3 capsules. The filled weight of ten capsules was 2.50 gm. The filled capsules were then cleaned with sodium chloride.

The following formulation is a typical tablet formula which may be used to incorporate the piperazine.

TABLE

| Ingredient | Amount/Tablet |
|---|---|
| Starch U.S.P. Corn | 13 mg. |
| Piperazine | 50 mg. |
| Calcium Phosphate Dibasic NF Dihydrate | 132 mg. |
| Water purified U.S.P. Distilled | q.s. |
| Magnesium Stearate | 1 mg. |
| Talcum (Talc U.S.P.) Powder | 4 mg. |
| | 200 mg. |

Tablets are prepared by using the above formula as follows: First a granulating step is carried out. Here a starch paste is made by adding 8 mg. of cornstarch to water and then heating. The piperazine is then milled with 5 mg. of additional cornstarch in an equal volume of calcium phosphate dibasic through a 40 mesh screen into a mass mixer. After sufficient mixing the balance of the calcium phosphate dibasic is milled through the 40 mesh screen and thereafter added to the mixer.

The hot cornstarch paste is then also added to the mixer and mixing is carried out until a granular stage is reached. In some instances additional warm water may be added, if necessary. Granulation is carried out through a ⅝ inch band. The granulated mixture is dried in a hot air oven at 50°C. overnight to 1.0% L.O.D. (Brabender ½ hr.). After drying, the mixture is sifted and then ground to 16 mesh.

Lubricating is carried out by charging half of the granulation into a blender. Talc and magnesium stearate are screened through a 30 mesh screen and charged into the blender. The remainder of the granulation is added and blended 15 minutes.

In order to form tablets, compression of the granulated material is carried out by using a 9/32 inch standard convex punch. The resultant tablets have a hardness of 7 – 9 and 10 tablets weigh 2.00 g.

I claim:

1. A method of treating a patient exhibiting symptoms of depression comprising the step of administering to said patient at least an effective dosage of the compound of the formula

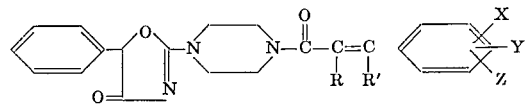

wherein R is hydrogen or a loweralkyl of one to six carbon atoms; R' is hydrogen, halogen or a loweralkyl of one to six carbon atoms and X, Y and Z each are hydrogen, halogen or a loweralkoxy selected from the group consisting of methoxy, ethoxy, propoxy or butoxy.

2. A method of claim 1 where said dosage range is from about 0.1 to about 100 mg./kg. of body weight daily.

3. A method of claim 2 where said dosage range is 25–50 mg./kg. of body weight daily.

* * * * *

UNITED STATES PATENT AND TRADEMARK OFFICE
CERTIFICATE OF CORRECTION

PATENT NO. : 3,856,958
DATED : December 24, 1974
INVENTOR(S) : Cheuk Man Lee

It is certified that error appears in the above-identified patent and that said Letters Patent are hereby corrected as shown below:

In the Abstract, line defining X, Y and Z, after the word "or" delete the word "loweralkyl" and substitute therefor --loweralkoxy--.

Signed and Sealed this second Day of December 1975

[SEAL]

Attest:

RUTH C. MASON
Attesting Officer

C. MARSHALL DANN
Commissioner of Patents and Trademarks